(12) United States Patent
Newton et al.

(10) Patent No.: US 9,301,206 B2
(45) Date of Patent: Mar. 29, 2016

(54) CHANNEL BANDWIDTH

(75) Inventors: Timothy Newton, Cambridge (GB); Robert Young, Cambridge (GB)

(73) Assignee: Neul Ltd., Cambridge (GB)

( * ) Notice: Subject to any disclaimer, the term of this patent is extended or adjusted under 35 U.S.C. 154(b) by 52 days.

(21) Appl. No.: 14/125,842

(22) PCT Filed: May 10, 2012

(86) PCT No.: PCT/EP2012/058651
§ 371 (c)(1),
(2), (4) Date: Apr. 22, 2014

(87) PCT Pub. No.: WO2012/171729
PCT Pub. Date: Dec. 20, 2012

(65) Prior Publication Data
US 2014/0295867 A1  Oct. 2, 2014

(30) Foreign Application Priority Data

Jun. 13, 2011 (GB) .................................... 1109840.7
Sep. 30, 2011 (GB) .................................... 1116910.9

(51) Int. Cl.
| | |
|---|---|
| *H04W 36/00* | (2009.01) |
| *H04W 72/00* | (2009.01) |
| *H04W 4/00* | (2009.01) |
| *H04L 12/26* | (2006.01) |
| *H04W 28/20* | (2009.01) |
| *H04W 16/14* | (2009.01) |

(52) U.S. Cl.
CPC .............. *H04W 28/20* (2013.01); *H04W 16/14* (2013.01)

(58) Field of Classification Search
CPC ..... H04W 16/14; H04W 72/02; H04W 24/04; H04W 24/08; H04W 72/042; H04W 72/0453; H04W 72/082; H04W 72/1226; H04W 24/00; H04W 72/0446; H04W 88/06; H04W 12/06; H04W 16/02; H04W 24/10; H04W 28/06; H04W 28/048; H04W 28/16; H04W 28/20; H04B 7/195; H04L 12/66
USPC .............. 455/62, 120, 15, 450, 452.1, 552.1, 455/63.1, 68, 11.1, 13.1, 13.4, 41.2, 509, 455/512, 561, 67.11, 12.1, 3.02, 427, 437; 370/252, 329, 208, 235, 278, 310, 330, 370/344, 348, 351, 389, 436, 443, 447, 478, 370/334

See application file for complete search history.

(56) References Cited

U.S. PATENT DOCUMENTS

| | | | |
|---|---|---|---|
| 8,855,708 B2 * | 10/2014 | Bhat et al. .................. | 455/552.1 |
| 2003/0156564 A1 * | 8/2003 | Frerking et al. .............. | 370/336 |
| 2006/0167784 A1 * | 7/2006 | Hoffberg ........................ | 705/37 |

(Continued)

FOREIGN PATENT DOCUMENTS

| | | | |
|---|---|---|---|
| GB | 2480002 A | 2/2011 | |
| WO | 2008144323 A1 | 11/2008 | |
| WO | WO 2008144323 | * 11/2008 | ............... H04B 7/26 |

(Continued)

*Primary Examiner* — Inder Mehra
(74) *Attorney, Agent, or Firm* — Slater & Matsil, L.L.P.

(57) ABSTRACT

A communication device for communicating via a wireless network that is permitted to operate only in communication channels that are not designated for use by another network, the communication device being configured to determine that it is permitted to use a communication channel and use only a part of the bandwidth of that communication channel in dependence on an activity associated with a device operating outside of the wireless network.

13 Claims, 3 Drawing Sheets

(56) References Cited

U.S. PATENT DOCUMENTS

2009/0325481 A1* 12/2009 Mohebbi .................. 455/15
2010/0304678 A1* 12/2010 Chandra et al. ........... 455/62
2013/0051360 A1*  2/2013 Monte .................. H04B 7/195
                                                  370/330

FOREIGN PATENT DOCUMENTS

| WO | 2010037230 | A1 | 4/2010 |
| WO | 2011047694 | A1 | 4/2011 |
| WO | 2011096746 | A2 | 8/2011 |
| WO | 2011127447 | A1 | 10/2011 |

* cited by examiner

CHANNEL BANDWIDTH

The invention relates to a communication device configured to communicate over a channel that has not been allocated to another communication device.

A wireless network may be configured to operate without having been specifically allocated any part of the electromagnetic spectrum. Such a network may be permitted to operate in so-called white space: a part of the spectrum that is made available for unlicensed or opportunistic access. Typically white space is found in the UHF TV band and spans 450 MHz to 800 MHz, depending on the country. A large amount of spectrum has been made available for unlicensed wireless systems in this frequency range.

A problem with operating in white space is that the available bandwidth is variable and cannot be guaranteed. These limitations are well-matched to the capabilities of machine-to-machine networks in which there is no human interaction. Machine-to-machine networks are typically tolerant of delays, dropped connections and high latency communications.

Any network operating in the UHF TV band has to be able to coexist with analogue and digital television broadcast transmitters. The density of the active television channels in any given location is relatively low (resulting in the availability of white space that can be used by unlicensed systems). The FCC has mandated that systems operating in the whitespace must reference a database that determines which channels may be used in any given location. This is intended to avoid interference with the TV transmissions and certain other incumbent systems such as wireless microphones.

For TV receivers (including those for digital TV (DTV)), there will inevitably be adjacent channels on which a strong transmission close to the TV receiver will interfere with TV reception. For example, the TV receivers may have image frequencies and poor adjacent channel rejection (ACR) on certain frequencies due to spurs on their local oscillators and limitations in their receive filters. These frequencies are often dependent on the specific receiver implementation and so are not amenable to being avoided through the database system.

Another problem with the database system is that increased sun spot activity tends to create abnormal propagation conditions at UHF. These abnormal propagation conditions may render some of the information in the database irrelevant, so that the database approach becomes decreasingly robust.

The white space database also only indicates which channels are being used by licensed users. It does not include any information on what channels might be subject to interference from unlicensed users.

There is therefore a need for adapting the communications of a device operating in an unlicensed part of the spectrum to other devices operating in the same part of the spectrum.

According to a first embodiment of the invention, there is provided a communication device for communicating via a wireless network that is permitted to operate only in communication channels that are not designated for use by another network, the communication device being configured to determine that it is permitted to use a communication channel and use only a part of the bandwidth of that communication channel in dependence on an activity associated with a device operating outside of the wireless network.

The communication device may be configured to detect interference associated with the activity of the other device and select the part of the bandwidth in dependence on the detected interference.

The communication device may be configured to predict an interference that will be associated with the activity of the other device and select the part of the bandwidth in dependence on the predicted interference.

The communication device may be configured to select the part of the bandwidth in dependence on information received from another communication device.

The communication device may be configured to select the part of the bandwidth in dependence on a part of the bandwidth of a channel over which it received a communication from another communication device.

The communication device may be configured to select a spreading factor to use when communicating via the part of the bandwidth of the communication channel in dependence on that part of the bandwidth.

The communication device may be configured to select a spreading factor that is, compared with the spreading factor the communication device is configured to use to transmit over the channel as a whole, reduced by the same divisor as the part of the bandwidth of the communication channel is reduced compared to the bandwidth of the channel as a whole.

The communication device may be configured to select a bandwidth of the part of the bandwidth of the communication channel in dependence on an activity associated with the other device.

The communication device may be configured to select a centre frequency of the part of the bandwidth of the communication channel in dependence on an activity associated with the other device.

The communication device may be configured to select the bandwidth of the communication channel to be a guard band associated with a television signal.

The communication device may be configured to use a larger part of the bandwidth of the communication channel for a downlink communication than for an uplink communication.

The communication device may be configured to communicate via a wireless network that operates in white space.

The communication device may be configured to communicate via a wireless network that is configured for machine-to-machine communication.

The communication device may be configured to use only part of the bandwidth of the communication channel by using less bandwidth than that which is available to it in accordance with a protocol governing use of that channel.

The communication device may be configured d to use only part of the bandwidth of the communication channel by using a part of the channel that is unavailable for conventional use in accordance with a protocol governing use of that channel.

According to a second embodiment of the invention, there is provided a method for communicating via a wireless network that is permitted to operate only in communication channels that are not designated for use by another wireless network, the method comprising determining that a communication device is permitted to use a communication channel and the communication device using only a part of the bandwidth of that communication channel in dependence on an activity associated with another device.

For a better understanding of the present invention, reference is made by way of example to the following drawings, in which.

Figure 3:
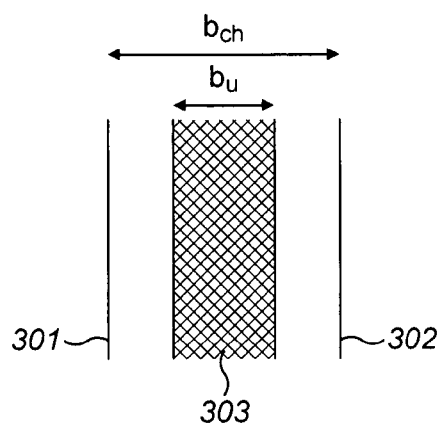
Figure 3:
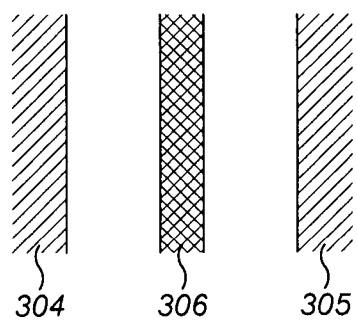
Figure 3:
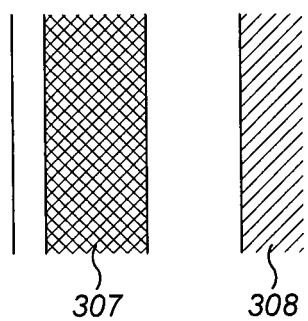
Figure 3:
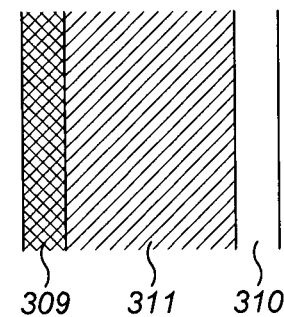
Figure 4:
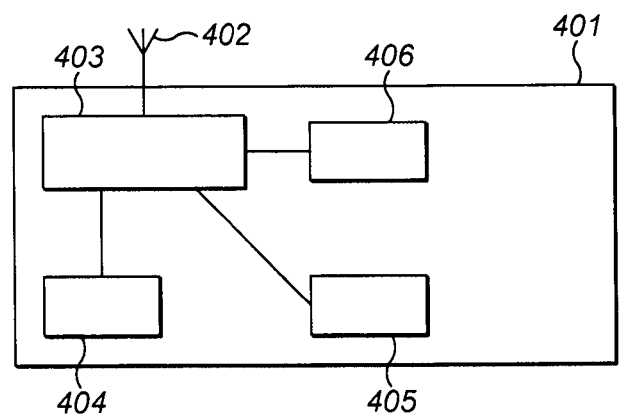

FIGS. 3(a) to 3(d) show examples of parts of a communication channel that may be used for communication; and FIG. 4 shows an example of a communication device.

A communication device may form part of a wireless network that operates in a section of the electromagnetic spectrum that is available for unlicensed or opportunistic access. As a consequence, the wireless network (and the devices comprised within it) may be permitted to operate only on channels that have not already been designated for use by another device or network, e.g. for transmitting DTV signals. The communication device may be configured to determine that it is permitted to use a communication channel, but may then use only a part or a portion of that channel in dependence on an activity associated with another device. The communication device can therefore adapt the bandwidth that it uses to the communications of devices operating outside of its network. In so doing, the communication device may actually use less bandwidth than that which is available to it.

The amount of bandwidth that is available to the communication device will often be mandated by a protocol that controls access to the communication channels. In some cases, the amount of available bandwidth will be less than the notional width of the channel. For example, a network using 8 MHz channels may have a nominal 3 dB bandwidth of 5 MHz. If the channels are 6 MHz wide, the nominal 3 dB bandwidth might be 4 MHz. A protocol often limits the amount of bandwidth that is actually available for conventional use of a channel so that so-called "guard bands" can be provided towards the edge of the channel with the aim of protecting transmissions in neighbouring channels from interference. A communication device according to one or more embodiments of the invention may be configured to use even less bandwidth than the restricted amount provided by the protocol. For example, the communication device may constrain its transmissions so that they do not extend to one or both of the guard bands. In another example, the communication device may actually use a guard band to transmit its data. In so doing, the communication device may again use less bandwidth than the restricted amount provided by the protocol, but in this case by using parts of the communication channel that may be unavailable for conventional use according to the protocol.

Whichever part of the channel the communication device selects for use, the driver is preferably to avoid causing interference to devices in other networks. If there is no activity in other networks that may be affected by the communication device's use of a channel, the communication device may use the channel in a conventional way. However, if activities in other networks may be affected, the communication device may use less of the channel than the protocol provides for conventional use. The part of the channel that the communication selects to use may change depending on the nature of those activities. This is described in more detail below.

One or more embodiments of the invention will now be described with specific reference to a wireless network in which the communication device is a base station. Other embodiments will be described with specific reference to a wireless network in which the communication device is a terminal. This is for the purposes of example only and it should be understood that the mechanisms for communicating over a communication channel described herein may be implemented in any suitable communication device, irrespective of what particular role that device plays within the network.

Figure 1:
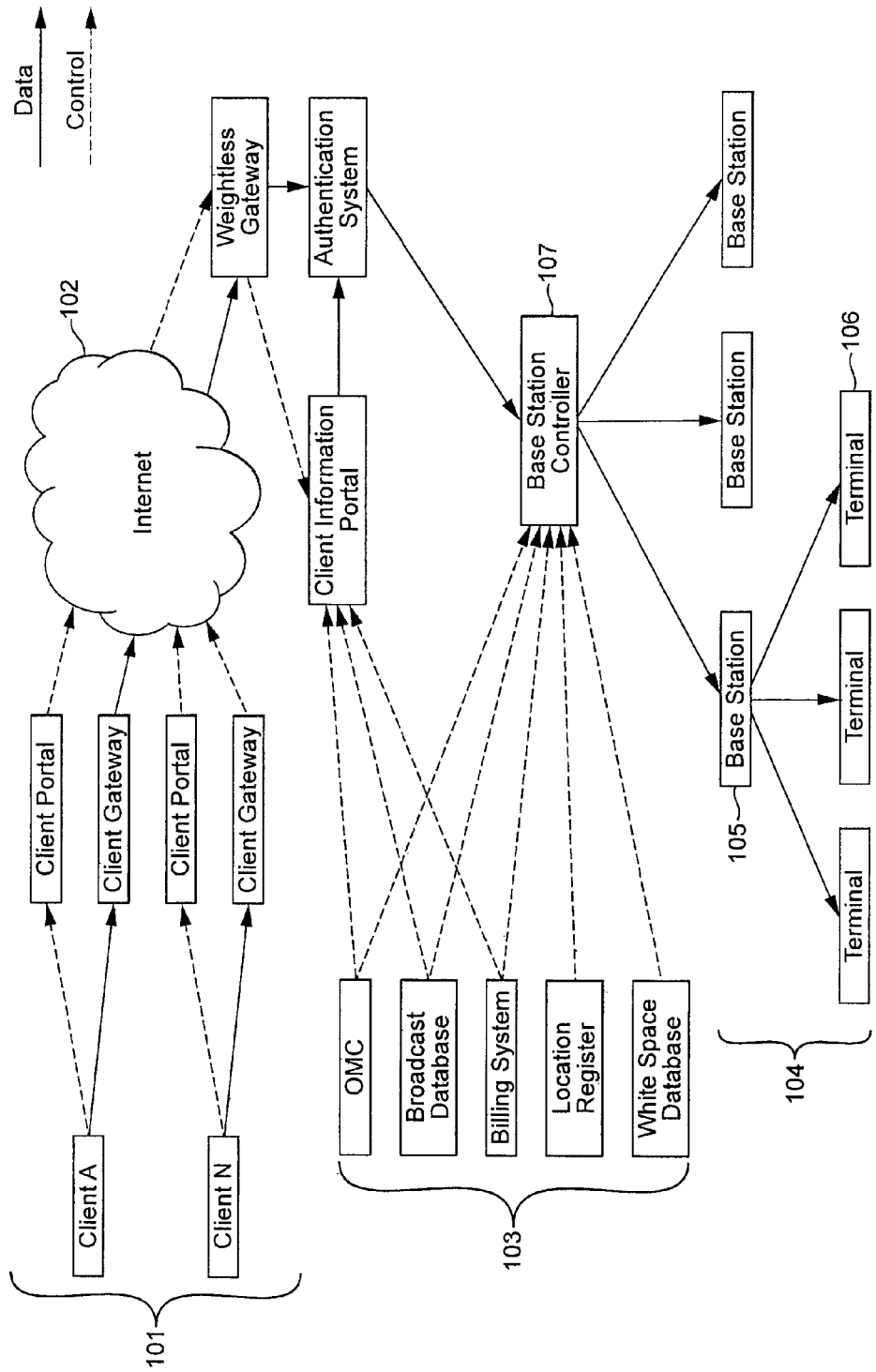
FIG. 1 shows an example of a machine-to-machine network.

An example of a wireless network is shown in FIG. 1. The network, shown generally at 104, comprises one or more base stations 105 that are each capable of communicating wirelessly with a number of terminals 106. Each base station may be arranged to communicate with terminals that are located within a particular geographical area or cell. The base stations transmit to and receive radio signals from the terminals. The terminals are suitably entities embedded or machines or similar that communicate with the base stations. Suitably the wireless network is arranged to operate in a master-slave mode where the base station is the master and the terminals are the slaves.

The base station controller 107 is a device that provides a single point of communication to the base stations and then distributes the information received to other network elements as required. The network may be arranged to communicate with a client-facing portion 101 via the internet 102. In this way a client may provide services to the terminals via the wireless network.

Other logical network elements shown in this example are:
Core network. This routes traffic information between base stations and client networks.
Billing system. This records utilisation levels and generates appropriate billing data.
Authentication system. This holds terminal and base station authentication information.
Location register. This retains the last known location of the terminals.
Broadcast register. This retains information on group membership and can be used to store and process acknowledgements to broadcast messages.
Operations and maintenance centre (OMC). This monitors the function of the network and raises alarms when errors are detected. It also manages frequency and code planning, load balancing and other operational aspects of the network.
White spaces database. This provides information on the available white space spectrum.
Client information portal. This allows clients to determine data such as the status of associated terminals, levels of traffic etc.

In practice, many of the logical network elements may be implemented as databases running software and can be provided on a wide range of platforms. A number of network elements may be physically located within the same platform.

A network such as that shown in FIG. 1 may be used for machine-to-machine communications, i.e. communications that do not involve human interaction. Machine-to-machine communications are well-matched to the limitations of operating in white space, in which the bandwidth available to the network may vary from one location to another and also from one time instant to the next. As the network does not have any specific part of the spectrum allocated to it, even unallocated parts of the spectrum may become unavailable, e.g. due to a device in the vicinity that is operating outside of the network but using the same part of the spectrum. Machines are well-adapted to be able to tolerate the delays and breaks in communication that can result from these varying communication conditions.

Figure 2:
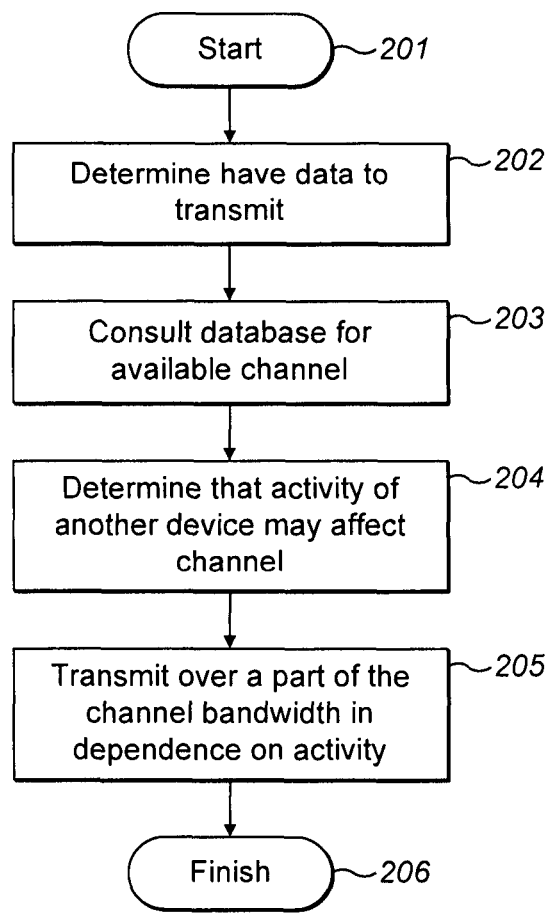
FIG. 2 shows an example of a process for communicating in the presence of interference from another device.

An overview of a communication mechanism according to one embodiment of the invention is shown in FIG. 2. The process commences in step 201. In step 202, the communication device determines that it has data to transmit. In step 203, the communication device consults a database to identify a channel that it is permitted to use for the transmission. In step 204, the communication device determines that an activity of another device, operating outside the wireless network to which the communication device belongs, may affect that channel. In step 205, the communication device transmits over a part of the available channel bandwidth in dependence on the activity that is likely to affect the channel. The process terminates in step 206.

The communication device will typically have access to a white space database. The database may indicate that an unlicensed user is permitted to use certain channels, e.g. channels that have not been allocated to a licensed user such as a DTV transmission. The available channels may vary in dependence on both location and time. Despite being marked as available, communications on those channels can still be subject to interference from other users and may cause interference to other users. For example, an "available" channel may be subject to emissions from licensed users, like signals from far-distant TV transmitters or spurious emissions from nearby TV transmitters. Other sources of potential interference may include devices operating in other wireless networks, such as Wi-Fi devices, wireless microphones, and other unlicensed users operating in white space. Interference may also be caused by the unintended emissions of devices that are not part of a wireless network, e.g. spurious emissions from faulty electric drills. In addition, a communication device operating in an available channel may cause unintended interference to a licensed user of the white space. For example, (as explained above) there will be adjacent channels on which a strong transmission close to the TV receiver will interfere with TV reception. Also, TV receivers may have image frequencies and poor adjacent channel rejection on certain frequencies due to spurs on their local oscillators and limitations in their receive filters.

The problems described above may be addressed by configuring a communication device such that it can adapt the bandwidth it uses to the activity of other devices in the vicinity. Such a device may be particularly well-suited to operating in a wireless network in an unlicensed part of the spectrum, which has to be able to tolerate a constantly varying bandwidth that cannot be guaranteed. A wireless network comprising such communication devices may have the ability to fully exploit whitespace, since it can scale its transmit bandwidth according to the nature of co-channel and adjacent-channel primary users (and any other user of the spectrum that the network has knowledge of). Adapting the transmit bandwidth in this way enables the network to be a better "neighbour" to other users of that part of the frequency spectrum. It also renders the network more robust as fewer packets may be lost due to interference from other devices.

The wireless network may maintain its own database of channels that are available for use. The communication device may store this database or access it from another part of the network if needed. The database may mark channels that are licensed to other users as unavailable. Channels may also be marked as unavailable if they have been found not to be useful because of poor propagation or throughput, or because the network has detected that they are in use by other devices.

A potential issue with reducing the bandwidth occupied by a transmission is that narrow bandwidth transmissions can be sensitive to poor reception due to multipath fading. This is because the entire bandwidth of a narrowband transmission could be in a long-term fade (lasting multiple frames), resulting in poor signal-to-noise ratio. This problem may be addressed using frequency hopping, which reduces the probability of the terminal being in a long-term fade. Frequency hopping also minimises the interference to TV reception, since no communication will be permanently causing interference to any given TV receiver. It also provides a form of interleaving that enables more efficient error correction to be used. The wireless network and the communication devices comprised within it are therefore preferably configured to use frequency hopping. The channels used for frequency hopping may be selected based upon information from the white space database on the available channels and associated power levels (which in turn are based upon the licensed spectrum use in the area).

The communication device may select a channel to use in dependence on the white space database, any database that the network keeps independently to record available channels and/or a frequency hopping sequence used in the network. If the network is set up with the base station acting as the master and the terminals acting as slaves, it is preferably the base station that selects which channel(s) will be used in communications with a particular terminal. The base station may inform the terminal of this channel allocation in advance of any communication, so that the terminal knows which channel to listen to/transmit on.

A communication device may determine that the activity of another device may either affect the communication device's communications or be affected by the communication device's communications in dependence on observations made by the communication device itself or in dependence on information received from another device. Observations made by the device could include detecting the presence of a signal on a channel, measuring a quality of a channel (e.g. the signal strength and/or bit error rate), a failure to receive one or more messages at the device, a failure to receive an acknowledgment for one or more messages transmitted by the device etc. Any of this information may be transferred between devices to enable an individual device to make a determination about the activity of one or more devices operating outside of the network. Typically this type of information would be transferred from a terminal to the base station, although a terminal may also receive information from the base station that it can use to determine that the activity of a device operating outside of the network. The terminal might be configured to make such a determination based simply on an indication from the base station that it should transmit on only part of the bandwidth of an available channel.

A communication device may also be configured to predict in advance that activity might occur to affect its communications. For example, the communication device may have prior knowledge of future activity in other devices or may be able to predict future signals to be transmitted by known licensed users. The communication device may be able to predict future activity based on past activity measured by that device or other devices operating in the network.

The communication device may characterise the nature of the interference and determine a reduced channel bandwidth accordingly. This can enable the use of a channel that would otherwise have too much interference to be usable. It also assists the network to meet the stringent adjacent channel protection requirements for white space.

The communication device may have a variety of different options at its disposal for communicating over part of the bandwidth of an available channel. Some of these options are illustrated in FIGS. 3(a) to (d). In the most straightforward case, the communication device may simply use only part of the channel, leaving the centre frequency unchanged. For example, in FIG. 3(a) the channel bandwidth $b_{ch}$ is defined by the boundary frequencies 301 and 302. The communication device has determined, however, that only a portion of the channel bandwidth should be used, and so it transmits on a reduced bandwidth $b_u$ (represented as cross-hatched portion 303 in the figure). Such a configuration might, for example, be suitable when there are incumbents on both adjacent channels. This situation is shown in FIG. 3(b), in which there are incumbents 304 and 305 in both adjacent channels, causing the communication device to use much reduced portion 306 of the available channel. As an example, with incumbents on both sides of the channel, the bandwidth used by the communication device might be divided by a factor of 4 but left centred on the channel's centre frequency.

In addition to scaling the bandwidth, a further option available to the communication device is to shift the centre frequency so it is offset within the whitespace channel. An example is shown in FIG. 3(c), in which the transmit bandwidth 307 has been shifted from the centre frequency of the channel to provide an additional frequency guard between the transmission and the neighbouring incumbent 308. As a practical example, a communication device might halve the signal bandwidth from 5 MHz to 2.5 MHz and shift it by say 2 MHz away from the adjacent incumbent. A further option is to utilise the frequency guard band at the edges of a channel being used by a distant DTV transmitter. This is illustrated in FIG. 3(d), with the communication device using one of the two guard bands 309, 310 to avoid distant incumbent 311. In this example, the communication device uses guard band 309. Using a guard band might typically give a bandwidth reduction factor of 16 (giving a 3 dB bandwidth of 312.5 kHz). The frequency offset may approach 4 MHz (with an 8 MHz channel), or may be exactly 4 MHz in the case that two adjacent channels have DTV interference well above the noise floor.

The base station may inform the terminal of what part of a channel bandwidth it should use for transmitting, in a similar way to how it may inform the terminal of which channel to listen to/transmit on. Alternatively terminals may simply adapt their behaviour to fit in with the signal transmitted by the base station. For example, a terminal may utilise the same bandwidth/centre frequency offset on the uplink that the base station used when communicating with it on the downlink.

The wireless network might typically use 8 MHz channels, giving a nominal 3 dB bandwidth of 5 MHz. If the channels are 6 MHz wide, the nominal 3 dB bandwidth might be 4 MHz. The communication device may be configured to use a spreading factor when transmitting, in order to increase processing gain at the receiving device. A communication device configured to use a reduced transmission bandwidth may be configured to reduce the spreading factor accordingly. The spreading factor may be reduced by the same factor as the channel bandwidth. The communication device may therefore be able to maintain the same bit duration (and data rate) despite having reduced its transmit bandwidth. The only adverse impact of reducing the transmit bandwidth may therefore be to reduce frequency diversity, so that there are some additional losses in poor multipath conditions.

A wireless network that is capable of using a narrow bandwidth for transmission is particularly well-suited to sharing frequency spectrum with DTV signals.

Digital TV uses a typical channel bandwidth of 6 to 8 MHz. Furthermore it uses OFDM modulation in which the overall channel bandwidth is split into a large number of narrower channels, termed sub-carriers, each of which is individually modulated in order to convey information. The system is designed such that if a certain number of sub-carriers are subject to multipath fading, so that their signal-to-noise ratio is poor, then the overall data can still be recovered. This is typically achieved by using interleaving and error correction codes such that bit errors which are localised to a limited number of sub-carriers can be corrected. Therefore, the OFDM modulation scheme achieves considerable robustness to multipath fading without requiring a highly complex equalisation method.

A further consequence of this choice of modulation scheme is that the DTV receiver is able to recover the transmitted data even when a certain number of sub-carriers are corrupted by an interferer. This applies when the interferer is relatively narrowband compared with the bandwidth of the overall TV signal, such that only a limited number of sub-carriers are affected. In contrast the OFDM scheme does not provide a similar performance benefit when the interferer occupies a relatively large proportion of the DTV channel bandwidth because in this case the error control coding may be incapable of correcting the bit errors since a higher proportion of bits may be corrupt.

Therefore, by configuring a communication device to reduce the bandwidth of its transmitted signal to a fraction of the DTV channel bandwidth the risk of the DTV receiver being unable to decode the signal correctly is reduced. Another perspective on this is that the communication device can be located much closer to the DTV receiver before causing noticeable degradation of the decoded DTV signal. This is a major benefit for mobile or portable devices whose exact location and antenna orientation cannot be easily constrained.

There are two potential issues with reducing the bandwidth occupied by the whitespace device's transmitter:
 1. Transmitting on a narrow bandwidth channel makes the whitespace device sensitive to poor reception due to multipath fading because the entire bandwidth could be in a deep fade resulting in very poor signal-to-noise ratio.
 2. The maximum data rate is dependent on the channel bandwidth, so will be reduced compared with using a wider channel bandwidth. This is because the maximum bits/sec data rate for every 1 Hz of bandwidth is limited typically to 6 (using 64 QAM), though in practise it is often reduced to about 4 after allowing for error control coding.

The first of these problems may be addressed by frequency hopping (as described above). The second problem may be addressed by reducing the spreading factor (also described above). However, there is another option for addressing the second problem, which may be used alone or in combination with reducing the spreading factor. This option is to have asymmetric channels on the uplink and the downlink (described in more detail below).

In the context of a whitespace based system that involves data communication between an access point or base station and a multitude of terminals, it is common that there is much heavier downlink traffic (from base station to terminal) than uplink traffic (from terminal to base station). This is due to common applications, such as internet browsing, multimedia streaming etc, tending to be very asymmetric in their data rate requirements. Another factor is that the terminals are often much more power consumption sensitive and cost sensitive than the base stations or access points, and so are designed to have lower transmitter power. This means that for terminals at larger distances from the base station, the uplink is likely to require longer bit durations (and hence lower bit rate) in order to compensate for the lower instantaneous transmitter power and still achieve the necessary energy per bit at the receiver.

The consequence of this is that there is little benefit in using a very wide uplink channel bandwidth because it is not essential to get higher peak uplink data rates for many applications (unlike the downlink). Also, for terminals at larger distances from the base station, the maximum data rate is limited not by the channel bandwidth but by the bit duration needed to achieve the required energy per bit at the receiver. For those terminals, it may not be an option to reduce the spreading factor used in its communications.

One option is for the communication device (and the network as a whole) to be configured to use a lower uplink channel bandwidth compared with the downlink channel bandwidth. This may mitigate the potential interference to a nearby DTV receiver. The uplink channel bandwidth may be optimised to maximise the peak uplink data rate for terminals close to the base station, while ensuring that the number of affected DTV sub-carriers is sufficiently small that the DTV receiver can still recover the data.

As an example, the terminal could be configured to use an uplink channel bandwidth in the range $1/16^{th}$ to $1/256^{th}$ of the overall TV channel bandwidth (typically 6 to 8 MHz), which means that about $1/16^{th}$ to $1/256^{th}$ of the DTV OFDM sub-carriers will be impacted by the narrowband interference (due to spectral leakage effects, the exact number may be somewhat higher than this). The downlink channel bandwidth would be a much larger proportion of the TV channel, for example between 50% and 100% of the channel, in order to maximise download data rates, given that the base station transmitter can be sited at a much greater distance from any DTV receivers.

Different devices within the network may be allocated different narrowband channels within the overall TV channel bandwidth such that they can transmit simultaneously. This maintains good overall uplink system capacity. Since there are unlikely to be many devices close to a particular DTV receiver, transmitting simultaneously should not cause a significant increase in the typical interference to a DTV receiver.

An example of the functional blocks that may be comprised in a communication device according to one embodiment of the invention are shown in FIG. 4. The communication device, shown generally at 401, comprises a communication unit 403 connected to an antenna 402 for transmitting and receiving messages. The communication device further comprises an analysis unit 404 for analysing the current communication conditions in the network and determining when and in what part of the spectrum activity from nearby devices is having an impact. The communication device also comprises a channel selection unit 405 for selecting an appropriate channel for communicating and an activity unit 406 for characterising activity from nearby devices and determining what part of an available channel should be used for communication accordingly. The communication unit may effectively act as a central controller for the acknowledgement process and may pass information between the other functional blocks.

The apparatus shown in FIG. 4 is shown illustratively as comprising a number of interconnected functional blocks. This is for illustrative purposes and is not intended to define a strict division between different parts of hardware on a chip. In practice, the communication device preferably uses a microprocessor acting under software control for implementing the methods described herein. In some embodiments, the algorithms may be performed wholly or partly in hardware.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems discloses herein, and without limitation to the scope of the claims. The applicants indicate that aspects of the present invention may consist of any such feature or combination of features. In view of the foregoing description it will be evident to a person skilled in the art that various modifications may be made within the scope of the invention.

The invention claimed is:

1. A communication device for communicating via a wireless network that is permitted to operate only in communication channels that are not designated for use by another network, the communication device being configured to:

determine that it is permitted to use a communication channel; and use only a part of the bandwidth of that communication channel by adjusting a bandwidth And center frequency of a transmission based on an activity associated with a device operating outside of the wireless network, wherein the adjusted center frequency is different from a center frequency of the communication channel, wherein the communication device is configured to select a spreading factor to use when communicating via the part of the bandwidth of the communication channel in dependence on the bandwidth of the communication channel, and the communication device is configured to select the spreading factor that is, compared with a spreading factor the communication device is configured to use to transmit over the channel as a whole, reduced by a same divisor as the part of the bandwidth of the communication channel is reduced compared to the bandwidth of the channel as a whole.

2. A method for communicating via a wireless network that is permitted to operate only in communication channels that are not designated for use by another wireless network, the method comprising:

determining that a communication device is permitted to use a communication channel; and the communication device using only a part of the bandwidth of the communication channel by adjusting a bandwidth and a center frequency of its transmission in dependence on an activity associated with another device, wherein the adjusted frequency is different from the center frequency of the communication channel;

the communication device selecting a spreading factor to use when communicating via the part of the bandwidth of the communication channel in dependence on bandwidth of the communication channel;

the communication device selecting a spreading factor that is, compared with the spreading factor a communication device is configured to use to transmit over the channel as a whole, reduced by a same divisor as the part of the bandwidth of the communication channel is reduced compared to the bandwidth of the channel as a whole.

3. A communication device for communicating via a wireless network that is permitted to operate only in communication channels that are not designated for use by another network, the communication device being configured to:

determine that it is permitted to use a communication channel; and use only a part of the bandwidth of the communication channel by adapting a bandwidth and center frequency of a transmission based on an activity associated with a device operating outside of the wireless network, wherein the communication device is configured to select a spreading factor to use when communicating via the part of the bandwidth of the communication channel in dependence on the bandwidth of the communication channel, and the communication device is configured to select the spreading factor that is, compared with a spreading factor the communication device is configured to use to transmit over the channel as a whole, reduced by a same divisor as the part of the bandwidth of the communication channel is reduced compared to the bandwidth of the channel as a whole.

4. A communication device as claimed in claim 3, wherein the communication device is configured to:
- detect interference associated with the activity of the other device; and
- select the part of the bandwidth in dependence on the detected interference.

5. The communication device as claimed in claim 3, wherein the communication device is configured to:
- predict an interference that will be associated with the activity of the other device; and
- select the part of the bandwidth in dependence on the predicted interference.

6. The communication device as claimed in claim 3, wherein the communication device is configured to select the part of the bandwidth in dependence on information received from another communication device.

7. A communication device as claimed in claim 3, wherein the communication device is configured to select the part of the bandwidth in dependence on a part of the bandwidth of a channel over which it received a communication from another communication device.

8. The communication device as claimed claim 3, wherein the communication device is configured to select the bandwidth of the communication channel to be a guard band associated with a television signal.

9. The communication device as claimed in claim 3, wherein the communication device is configured to use a lager part of the bandwidth of the communication channel for a downlink communication than for an uplink communication.

10. The communication device as claimed in claim 3, wherein the communication device is configured to communicate via a wireless network that operates in white space.

11. A communication device as claimed in claim 3, wherein the communication device is configured to communicate via a wireless network that is configured for machine-to-machine communication.

12. The communication device as claimed in claim 3, wherein the communication device is configured to use only part of the bandwidth of the communication channel by using less bandwidth than that which is available to it in accordance with a protocol governing use of that channel.

13. The communication device as claimed in claim 3, wherein the communication device is configured to use only part of the bandwidth of the communication channel by using a part of the channel that is unavailable for conventional use in accordance with a protocol governing use of that channel.

* * * * *